United States Patent [19]
Blechen et al.

[11] Patent Number: 5,502,364
[45] Date of Patent: Mar. 26, 1996

[54] AIRCRAFT AUTOMATIC THROTTLE FORWARD STOP SERVO SYSTEM AND METHOD

[75] Inventors: Frederick C. Blechen, Redmond; Michael W. Kelley, Renton; David K. Lyndon, Issaquah, all of Wash.

[73] Assignee: The Boeing Company, Seattle, Wash.

[21] Appl. No.: 98,163

[22] Filed: Jul. 26, 1993

[51] Int. Cl.[6] .............................. G05B 9/03; G05D 1/08
[52] U.S. Cl. .......................... 318/618; 318/626; 318/632; 318/564; 244/182
[58] Field of Search .................... 318/560–646; 244/188, 192, 182, 183, 178, 180, 181, 184, 189, 3.21, 177, 234, 194; 340/968, 970, 964; 364/440, 433, 428, 430, 435, 427, 434, 177; 73/178 T, 178 R, 861.74

[56] References Cited

U.S. PATENT DOCUMENTS

| | | | |
|---|---|---|---|
| 3,604,908 | 7/1971 | Loome et al. | 244/77 |
| 3,618,878 | 11/1971 | Klein et al. | 244/77 D |
| 3,633,088 | 1/1972 | Kupersmith | 318/626 |
| 3,840,200 | 10/1974 | Lambregts | 244/77 D |
| 3,843,877 | 10/1974 | Roselle et al. | 235/189 |
| 3,892,374 | 7/1975 | Lambregts | 244/77 D |
| 3,908,934 | 9/1975 | Schloeman | 244/77 D |
| 3,981,442 | 9/1976 | Smith | 244/182 |
| 3,989,208 | 11/1976 | Lambregts | 244/182 |
| 4,007,361 | 2/1977 | Martin | 318/561 |
| 4,035,705 | 7/1977 | Miller | 318/564 |
| 4,114,842 | 9/1978 | Hofferber et al. | 244/180 |
| 4,155,525 | 5/1979 | Peter-Contesse | 244/182 |
| 4,189,118 | 2/1980 | Peter-Contesse | 244/182 |
| 4,189,119 | 2/1980 | Peter-Contesse et al. | 244/182 |
| 4,209,152 | 6/1980 | Stephan | 244/182 |
| 4,212,444 | 7/1980 | Stephan | 244/182 |
| 4,220,993 | 9/1980 | Schloeman | 364/431 |
| 4,656,407 | 4/1987 | Burney | 318/626 |
| 4,912,642 | 3/1990 | Larsen et al. | 364/431.01 |
| 5,036,469 | 7/1991 | Pelton | 364/428 |
| 5,188,316 | 2/1993 | Dressler et al. | 244/234 |

OTHER PUBLICATIONS

IBM Technical Disclosure Bulletin, vol. 19, No. 12, Jul. 1976, pp. 659–600.

*Primary Examiner*—Paul Ip
*Attorney, Agent, or Firm*—James P. Hamley

[57] ABSTRACT

An aircraft automatic throttle system is responsive to a throttle command signal to drive the aircraft throttle through a clutch and detent mechanism which allows for pilot override. Full throttle is achieved only if the throttle is driven against the stop position at the engine with a controlled, limited force. The instant invention is an improved servoamplifier system and method including a position sensor for sensing the position of the throttle, a summing circuit for summing the throttle command signal with the position sensor signal to produce an error signal and an amplifier for amplifying the error signal and producing an output signal to drive the servo driver. Unique signal processing is provided which monitors the amplifier output signal and detects a predetermined condition thereof representative of the throttle being driven against the forward stop at the engine. In response to detection of this condition, a control signal is applied to the summing circuit which results in the servo system driving the throttle against the stop position with a force which is controlled below a limit to assure stable, in-detent operation.

31 Claims, 3 Drawing Sheets

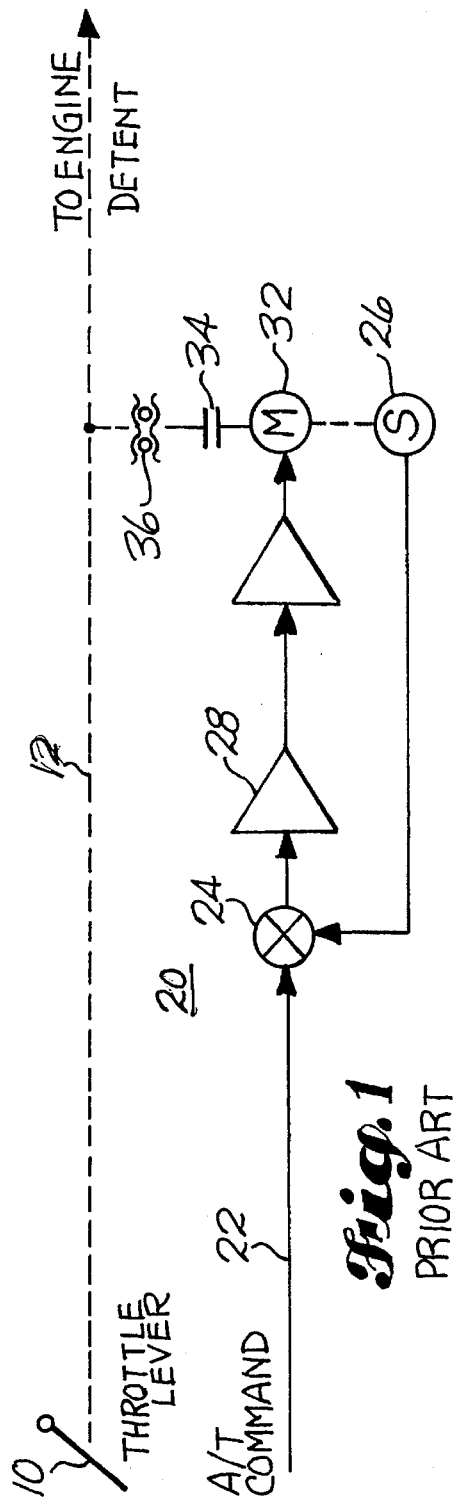
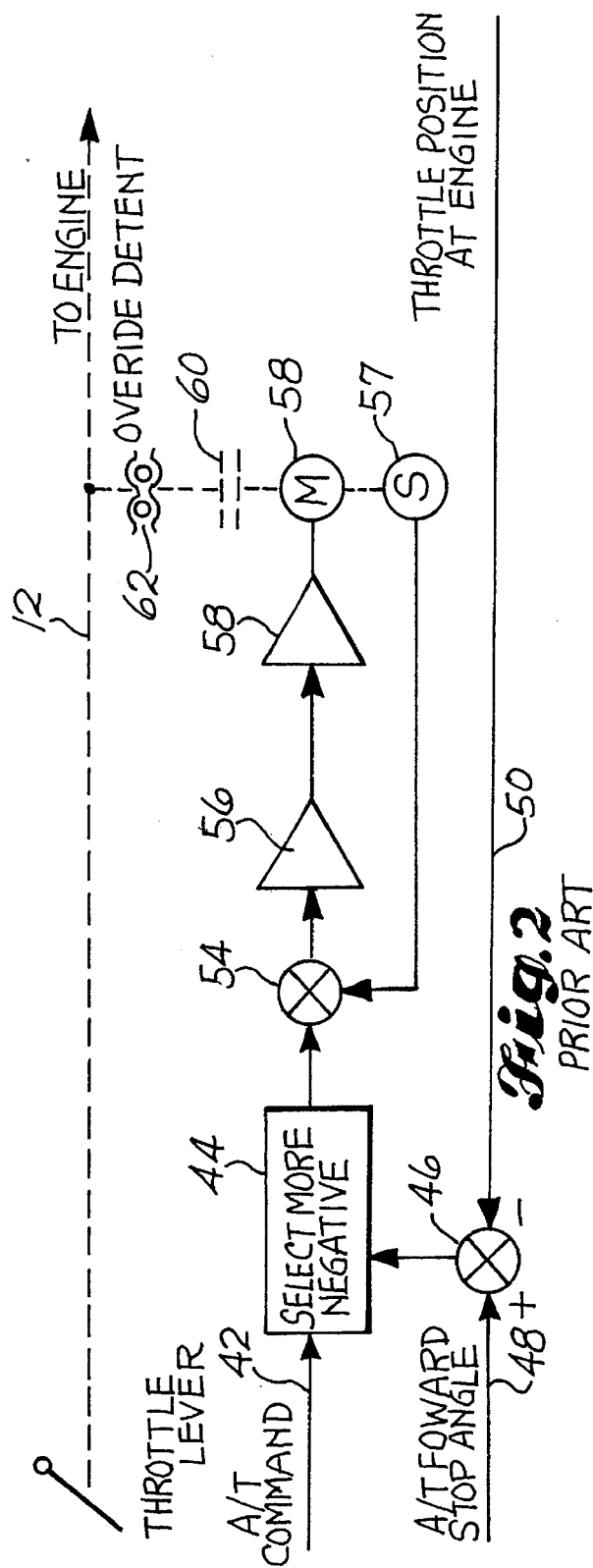

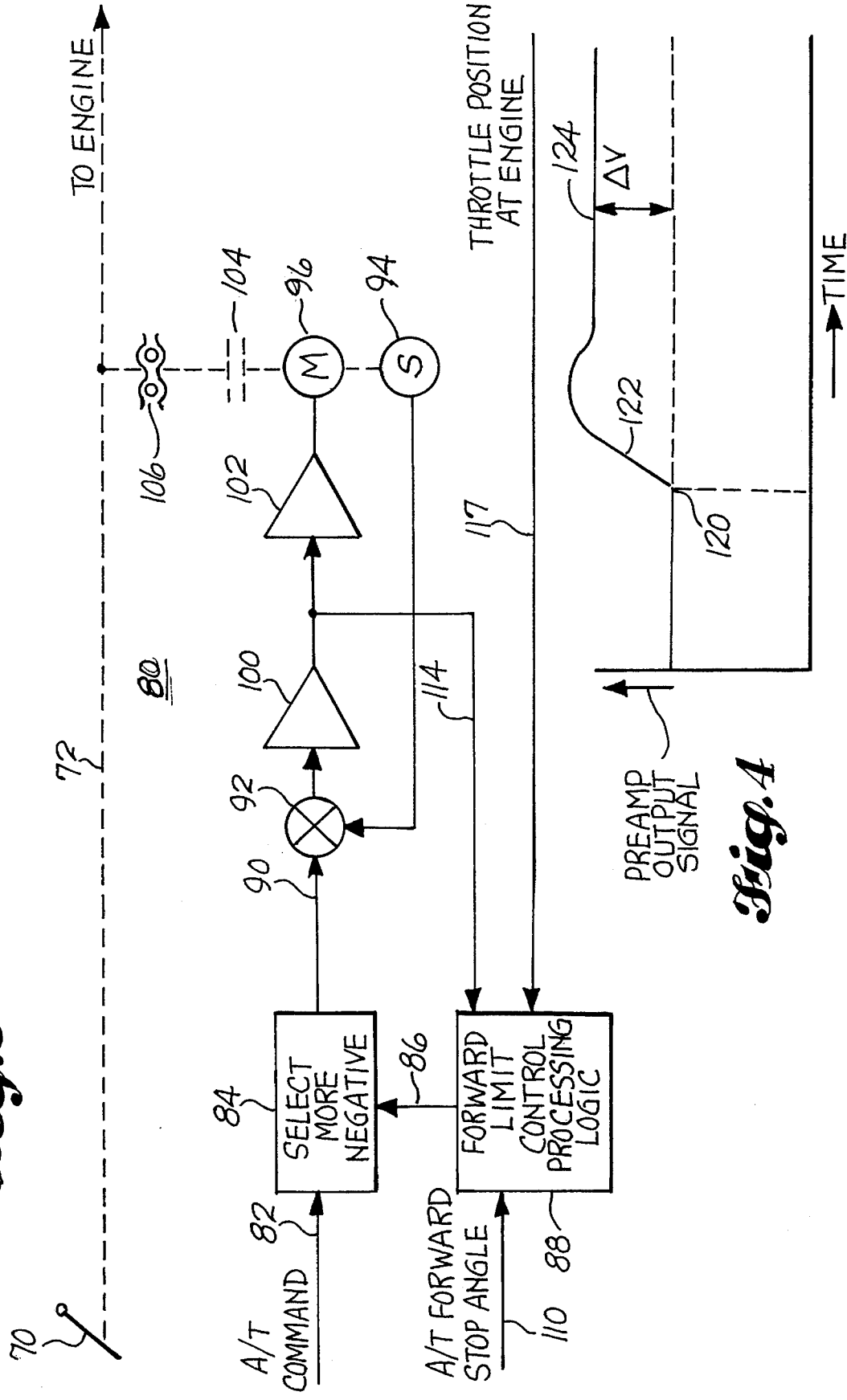

AIRCRAFT AUTOMATIC THROTTLE FORWARD STOP SERVO SYSTEM AND METHOD

BACKGROUND OF THE INVENTION

The present invention relates to the servo system art and, in particular, to a method and apparatus for automatically controlling the position of a device against a stop position with a controlled, limited force. The invention finds particular application in aircraft automatic throttle control systems.

An excellent example of a servoamplifier control device which must be driven against a stop, but with a controlled, limited force is found in the aircraft automatic throttle control art. In modern commercial aircraft, forward throttle travel is constrained to the jet engine main engine control forward stop. The angular range of the throttle lever is approximately 60°. Normally, the throttle commands maximum takeoff or go-around thrust from the jet engine with eight to ten degrees margin to the forward stop, or at about 50° to 52° of angular throttle travel. In certain aircraft, such as Boeing model 737-300 and 737-500, jet engines exhibiting "fire-walled" thrust capability in excess of the nominal loading of the aircraft control surfaces have had their forward stop reduced by 8° to 10°. This keeps the thrust within the capability of the aircraft control surfaces. In the worst case tolerance scenario, the throttle is driven against the reduced forward stop during takeoff power.

An automatic throttle system drives the engine throttle through a clutch arrangement. The clutch allows the pilot to override the automatic throttle with a force no greater than that required to manually move the throttles. In the event that the clutch jams or fails to release, a secondary breakout detent mechanism is provided, whereby the pilot, at the expense of increased throttle loads, can override the jammed clutch by breaking out the detent mechanism to thereby control the engine throttle position.

The automatic throttle system experiences a problem when tolerances dictate that the required throttle position for takeoff is at, or slightly above, the forward stop at the main engine control. The automatic throttle, driving through the clutch and detent mechanism, tends to drive the throttle lever into the forward stop. At the forward stop, the autothrottle will increase the servo torque until the override detent mechanism is forced out of detent. Since the detents are several degrees apart, it may take several seconds for the automatic throttle to move the throttle lever position to the next detent in order to regain full control at which time the throttle will snap back a couple degrees.

SUMMARY OF THE INVENTION

It is an object of the invention, therefore, to provide an improved servoamplifier system and method for assuring that a servo controlled device be driven against a stop position with a controlled, limited force.

It is a particular object of the invention to provide an improved aircraft automatic throttle system which is capable of driving the throttle device against a stop with controlled force such that the override detent clutch is not driven out of detent.

Briefly, according to the invention, a servoamplifier system is responsive to a command signal for driving a servo controlled device against a stop position of said device. The system comprises a position feedback sensor for producing a feedback signal representative of the position of the device. A summing means sums the command signal with the feedback signal to produce an error signal. An amplifier receives the error signal and produces an output signal adapted to drive the servo controlled device. Processing circuitry monitors the amplifier output signal and, in response to detecting a predetermined condition of the output signal representative of the servo controlled device being in the stop position, applies a predetermined control signal to the summing means such that the servo controlled device is biased against the stop with a controlled force.

The inventive method, according to the invention, is for use in a servo amplifier system which is responsive to a command signal for driving a servo controlled device against a stop position of said device. The method comprises the steps of: a) producing a feedback signal representative of the position of the device, b) summing the command signal with the feedback signal to thereby produce an error signal, c) providing amplifying means for receiving the error signal and producing an output signal adapted to drive the servo controlled device and d) providing processing means for monitoring the amplifying means output signal and, in response to detecting a predetermined condition of the output signal representative of the device being against the stop position, applying a predetermined control signal to the summing means such that the servo controlled device is biased against said stop position with a controlled force.

Numerous other aspects and objects of the invention will become apparent upon review of the specification and claims that follow.

BRIEF DESCRIPTION OF THE DRAWINGS

FIG. 1 is a schematic diagram illustrating the principle components of an aircraft automatic throttle control system;

FIG. 2 is a schematic diagram illustrating a prior attempt to provide an automatic throttle control system which includes a forward limit;

FIG. 3 is a schematic diagram illustrating a preferred embodiment of the present invention for use in an aircraft automatic throttle control system;

FIG. 4 is a signal waveform illustrating the output signal from the preamplifier of FIG. 3 as the throttle approaches and is held against the stop position.

DETAILED DESCRIPTION

Figure 5:
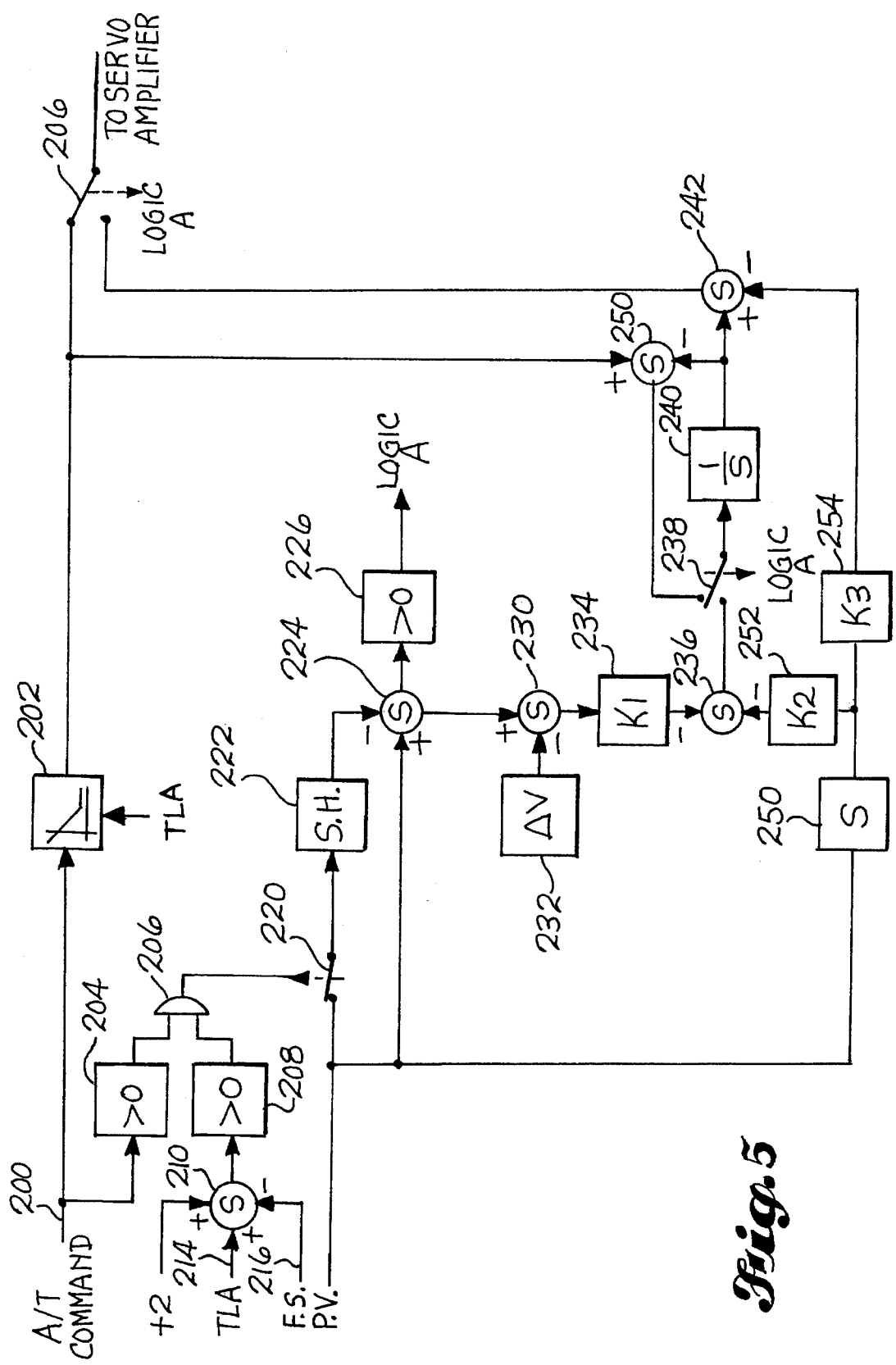
FIG. 5 is a detailed schematic diagram of the logic processing circuitry according to the preferred embodiment of the invention.

FIG. 1 is a schematic diagram illustrating servo systems which are known to the prior art for use in aircraft automatic throttle control systems.

Referring to FIG. 1, a throttle lever 10 which is mounted on the flight deck, connects by a throttle cable 12 to the engine throttle control (not shown). In this way, the pilot has manual control of the thrust setting of the engine.

An automatic throttle system, indicated generally at 20, is provided which, in the known manner, automatically controls throttle position. The input to the system is provided by automatic throttle logic circuitry (not shown). The automatic throttle logic circuitry produces an automatic throttle rate command which is input to the servo system over the input line 22. The command signal is summed in a summer 24 with a tachometer feedback signal as provided by a tachometer feedback sensor 26. The resulting signal from summer 24 is amplified by a preamplifier 28 and then applied to the input of a driver 30. The output from the driver 30 drives the servo motor 32 which couples through a clutch 34 and an override detent assembly 36 to the throttle cable 12.

In operation, the servo system 20 compares the automatic throttle command signal on line 22 with the tachometer feedback signal, provided by sensor 26, in the summer 24 to produce an error signal. The error signal is amplified by preamplifier 28 and then applied through the driver 30 to the motor 32. The motor 32, acting through clutch 34 and override detent assembly 36 operates on the throttle cable 12 to control engine thrust.

The clutch 34 allows the pilot to override the automatic throttle system 20 with a force no greater than that required to manually move the throttles. In the event that the clutch 34 jams or fails to release, a provided breakout detent mechanism in the override detent assembly 36 allows the pilot, at the expense of increased throttle loads, to override the jammed clutch by breaking out the detent mechanism and thereby controlling the throttles.

A problem with such automatic throttle systems, however, arises when tolerances dictate that the required throttle position for takeoff power is at or slightly above the forward throttle stop provided in the engine. Forward throttle travel by the throttle lever 10 is constrained to not exceed the main engine control forward stop (not shown). The angular range of the throttle lever 10 is, in one embodiment of the invention, approximately 60 degrees. Normally, the throttles are set at maximum thrust for takeoff or go-around maneuvers. Maximum thrust is set with 8 to 10 degrees margin to the forward stop, or at about 50° to 52° degrees of throttle travel. In certain aircraft, such as the Boeing 737-300 and 737-500, the provided engines have a "fire-walled" thrust capability in excess of that which the aircraft surfaces were nominally designed to control. As such, these aircraft incorporate a forward stop which is reduced by 8 to 10 degrees. This keeps the thrust well within the capability of the aircraft control surfaces. In a worst case scenario, the throttle is driven against the reduced forward stop during takeoff or go-around.

The automatic throttle system 20, driving through the override detent assembly 36 will drive through the provided detent and then out of detent causing the engine throttles to snap back a couple of degrees. Since the detents are several degrees apart, it can take several seconds for the automatic throttle 20 to move the throttle to the next detent in order to regain full control.

Thus, an automatic throttle rate command on line 22 which commands maximum thrust causes the output from preamplifier 28 to increase whereby drive 30 to motor 32 increases driving the override detent clutch assembly out of the detent position causing the aforedescribed undesirable throttle snap back condition.

FIG. 2 is an example of one prior art attempt to provide a servo amplifier with a forward limit in order to avoid the "out of the detent" problem described with respect to FIG. 1. Here, as before, an automatic throttle rate command signal is input on a line 42. This signal is now applied as one of two inputs to a Select More Negative Logic block 44. The other input from the Select More Negative Logic block 44 is the output from a summer 46 which has as its inputs an automatic throttle forward stop angle on line 48 and a signal representative of the actual throttle position at the engine over a line 50. The output from the select more negative logic block 44 is applied to a summer 54 which also receives the sensor signal from the tachometer 57 which monitors the servo motor 58. The resultant signal out of summer 54 is amplified in a preamplifier 56 and then applied through a driver 58 to the servo motor 58. The motor, as with the embodiment of FIG. 1, operates through a clutch 60 and an override detent mechanism 62 to control the position of the throttle cable 12.

Here, the forward limit signal as provided over line 48 is incorporated to control throttle travel to a limit which does not exceed a given angle. This angle is chosen to prevent the throttle from driving against the forward throttle stop at the engine. The forward limit operates by switching to the most aft direction, or negative command, through the Select More Negative Logic block 44. As the throttle approaches the stop, forward stop angle on line 48 minus the throttle angle signal on line 50 becomes more negative than the automatic throttle command signal provided on line 42. As such, it is selected by the Select More Negative Logic block 44 as the controlling signal to be applied to the summer 54 at the input of the servo system.

The problem with the forward stop limit servoed system as described with respect to FIG. 2 is that selection of the forward stop limit angle for the servo system must be less than the actual cable system stop at the engine to account for tolerances and to prevent the servo from driving against the servo system stop. In practice, this means that the automatic throttle cannot actually move the throttles as far forward as the pilot might, whereby the range of thrust controlled by the automatic throttle system is less than might be desired for certain takeoff or go-around maneuvers.

FIG. 3 is a schematic diagram illustrating the primary components of the preferred embodiment of the servo control system as implemented in an aircraft automatic throttle system. Here, as with FIGS. 1 and 2, the pilot, via a throttle lever 70, sets a desired engine throttle level. The throttle position is carried over a throttle cable 72 to the throttle control on the engine (not shown).

Engine throttle is also controlled by way of a servo system, indicated generally at 80. The automatic throttle commanded input signal (provided by command circuitry not shown) is input over a line 82 to the Select More Negative Logic block 84. A second input to the Select More Negative Logic block 84 is provided over a line 86 from a forward limit control processing logic block 88. The output from the Select More Negative Logic block 84 is passed over a line 90 as one input to a summing circuit 92. The other input to the summing circuit 92 is a provided signal from a tachometer sensor 94 which senses the rate of the rotation of the servo motor 96.

The summer 92 sums the commanded signal, as provided through the Select More Negative Logic block 84, with the position signal out of sensor 94 to produce an error signal which is coupled to preamplifier 100. Preamplifier 100 amplifies the error signal and applies it to a driver circuit 102, which in turn drives the servo motor 96.

The servo motor 96 acts through an automatic throttle clutch 104 and an override detent mechanism 106 thereafter being coupled to the throttle cable 72. The clutch 104 and override detent mechanism 106 act in the manner aforedescribed to allow the pilot, via throttle lever 70, to override the automatic throttle control system 80 and, in the event of a jam of the clutching mechanism 104, provide pilot control via the override detent mechanism 106.

A particular feature of the present invention is the processing provided by forward limit control processing logic 88. It receives as an input signal a signal over line 110 which represents the desired automatic throttle forward stop angle limit. This signal could, for example, be a fixed DC level signal.

Also provided as an input to the forward limit control processing logic block 88 is a feedback signal over a line 112 which is representative of the actual throttle position at the engine. This signal could be provided, for example, via a synchro or linear variable differential transformer, as is well known in the aircraft art.

Also provided as an input signal to the forward limit control processing logic block 88 is the signal at the output of the preamplifier 100, as provided over a line 114.

The significance of the signal out of the preamplifier 100 is best understood with reference to the waveform diagram set forth in FIG. 4. Here, plotted on the vertical axis is the output signal from the preamplifier 100. On the horizontal axis is time. In the servo system 80 of FIG. 3, the magnitude and polarity of the signal out of the preamplifier 100 is proportional to the power output of the servo driver 102 and, consequently, the torque output of the servo motor 96. Thus, as shown in FIG. 4, the preamplifier output signal is essentially constant for slow travel of the throttles up to the forward stop position. Once the forward stop position has been reached, there is an increase of motor 96 torque and of the preamplifier signal, as represented by the sharp increase at waveform 120. As the servo system continues to drive against the stop, more torque from the motor 96 is applied and a corresponding increase in the output from preamplifier 100 occurs as represented by the increasing waveform 122.

The forward limit control processing logic 88 of FIG. 3 is designed, in this the preferred embodiment of the invention, to sense the forward stop of the throttle and generate a control signal to servo amplifier 80 to bias the throttle against the forward stop as illustrated by the flat portion 124 of the waveform shown in FIG. 4. This, as will be seen, is accomplished by sampling and storing the preamplifier 100 signal at 2 degrees of throttle angle before the forward stop and then controlling the servo amplifier signal to a value $\Delta V$ above this level which represents the throttle being driven into, and safely against the forward stop with only enough torque to hold the throttle gently against the forward stop, thereby assuring that the servo does not drive out of the override detent clutch causing the undesired throttle fallback condition known to the prior art.

FIG. 5 is a detailed block diagram illustrating the preferred embodiment of the Select More Negative Logic block 84 and, more particularly, the forward limit control processing logic 88 as shown in FIG. 4. It should be understood that whereas the discussion of FIG. 5 could be used to implement the invention in analog form, the preferred embodiment of these blocks was implemented as an instruction set for a digital computer.

The automatic throttle command signal is received at input line 200. This signal is coupled both as the input signal to a rate limit block 202 and as the input of comparator block 204. The output from the rate limit block 202 is passed through a switch 206 to the input of the servo amplifier (item 92 of FIG. 4).

An additional input to the rate limit block 202 is a signal "TLA" representative of a throttle lever angle. Rate limit block 202 acts to limit the automatic throttle command signal to lower values as the throttle lever approaches the forward stop. In fact, when the throttle lever reaches five degrees before the forward stop position, the rate limit imposed on the automatic throttle command signal is limited at a low, constant value. As will be understood more fully with respect to the description hereinbelow, slowing down the rate to a low, constant value assures that the signal from the preamplifier (item 100 in FIG. 3) will be at a minimum required to move the throttle. This is important since, as will be discussed more fully, this signal is used as a reference for further processing.

Comparator 204 operates to generate an output "true" logic level in response to the automatic throttle command being positive, thereby representing an advancing throttle condition. This output is applied to one input of an AND gate 206. The other input to AND gate 206 is an output from a second comparator 208. Comparator 208 is driven from the output of a summer 210 that receives as its inputs a two degree bias level signal over line 212, the throttle lever angle signal "TLA" over line 214 and a signal representative of the forward stop "F.S." over a line 216. The output of summer 210 is positive for the condition of the throttle being within two degrees of the throttle forward stop or greater than the forward stop. Comparator 208, therefore, outputs a logic "true" level when the output of summer 210 is positive.

The output from AND gate 206 assumes a logic "true" level when both comparators 204 and 208 output a logic "true" level. Thus, the output from AND gate 206 is "true" for the condition wherein the throttle is driving forward and is within two degrees of the forward stop.

A logic "true" output from AND gate 206 activates a switch 220 to its open position. Prior to switch 220 opening, the output signal from the preamplifier (item 100 of FIG. 4), identified as a signal "PV", is directed through switch 220 to the sample and hold circuit 222. Thus, the operation of the circuitry just described acts to cause the sample and hold circuit 222 to store and hold the preamplifier output signal for the condition of the throttle lever reaching two degrees before detent. Since, as described above, in the range from five degrees before detent to detent the automatic throttle command rate has been limited to a low, constant value, the level stored by sample and hold circuit 222 represents the voltage required out of the preamplifier to drive the throttle at a slow rate immediately prior to the throttle stop. Since, as will be described more fully hereinbelow, the processing system uses this held voltage as a baseline for determining the increase force required to hold the throttle lever against the forward stop. It is seen that the system thereby accounts for variability due to friction, voltage variations and variance from servo to servo. Note that any increase in the preamplifier output signal PV beyond that stored in sample and hold circuit 222 indicates an increased force due to reaching the forward stop of the throttle at the engine.

Summer 224 sums the actual preamplifier output signal PV with the stored value from sample and hold 222 in such a way that the summer output is positive for actual values in excess of the stored value, thereby indicating that the throttle lever is bearing against the forward stop. A positive output from summer 224 is sensed by a comparator 226 which outputs a logic true value responsive thereto. This true value, indicated as "LOGIC A", controls switching functions, as described hereafter, which limit further increases of the preamplifier output signal to thereby prevent the throttle servo from driving the override detent clutch out of detent.

The output from summer 224 is also applied as an input to a summer 230. The remaining input to summer 230 is a differential signal "$\Delta V$" provided out of block 232. The $\Delta V$ signal acts as a bias term and insures that the output of the preamplifier is held slightly higher than the sample and hold value out of sample and hold 222 to thereby assure that the throttle lever is held up against the forward stop with a slight amount of force. Notice that this "$\Delta V$" value is the same as that shown in the waveform of FIG. 4.

The control signal out of summer 230 is then gain multiplied in a gain block 234 by a gain factor K1 which is determined by the particular implementation. The resulting signal is summed in a summer 236 and passed through a switch 238, if switch 238 is activated to its closed position by the "LOGIC A" signal, to the input of an integrator 240. The output from integrator 240 is passed as an input to summer 242. The output from summer 242, which represents the held value plus the bias term ΔV, is then fed through switch 206, if activated to a position to pass the output from summer 242, directly to the input of the servo amplifier to thereby bias the throttle lever against the forward stop.

The output from integrator 240 is also passed as an input to a summer 250. The remaining input to summer 250 is the automatic throttle command signal as passed through the rate limit circuit 202. The output from summer 250 feeds back through switch 238, when it is not activated by the "LOGIC A" level, as an input 240. The function of the integrator 240 and its associated circuitry is to accomplish a washout function whereby when the switch 206 is activated to its "LOGIC A" position, a smooth signal transition is realized at the input to the servo preamplifier.

The preamplifier output signal PV is passed to an input of a differentiator 250. The output from differentiator 250 is multiplied by a scale factor K2 in gain block 252 and applied as the remaining input to the summer 236. The output of summer 236 is integrated by integrator 240 to obtain both an integral term and a displacement term for control of the preamplifier output signal PV.

The output of differentiator 250 is also gain factored by a factor K3 in gain block 254 and passed as the remaining input to summer 242. Thus, differentiator 250 provides a rate of change of the amplifier output signal PV to the system such that when switch 206 is activated via the "LOGIC A" level, both the integral and displacement terms from integrator 240 and the rate of change of PV are applied to the system to control the output signal PV to the held value of PV in 222 plus the ΔV term 232. The output of summer PV contains proportional, integral and rate terms for the purpose of controlling PV in a manner known in the art of control theory.

In summary, an improved servo amplifier system and method has been described which is particularly suited for driving a servo controlled device into a forward stop position with a controlled force. The device finds particular application in the aircraft art for use in an automatic throttle forward stop control.

While a preferred embodiment of the invention has been described in detail, it should be apparent that many modifications and variations thereto are possible, all of which fall within the true spirit and scope of the invention.

We claim:

1. A servo amplifier system responsive to a command signal for driving a servoed device against a stop position of said device, said system comprising:

position feedback means for producing a feedback signal representative of the position of said device;

summing means for summing said command signal with said feedback signal to produce an error signal;

amplifier means for receiving said error signal and producing an output signal adapted to drive said servoed device; and processing means for monitoring said amplifier means output signal and, in response to detecting a predetermined condition of said output signal representative of said device being in said stop position, applying a predetermined control signal to said summing means such that said servoed device is biased against said stop position with a controlled force, said processing means further comprising retraction detection means for determining the condition of said servoed device being retracted from said stop position and inhibiting said control signal responsive thereto such that said device may be retracted from said stop position without opposition from said servo system.

2. The servoamplifier system of claim 1 wherein said processing means comprises:

sample and hold means for storing the value of the amplifier means output signal at a predetermined position of said servoed device just prior to said stop position; and comparator means for comparing said stored amplifier means output signal value with the actual value of said output signal and producing said control signal responsive to a predetermined relationship therebetween.

3. The servoamplifier system of claim 2 wherein said comparator means produces said control signal responsive to the actual value of the amplifier means output signal exceeding said stored value by a predetermined constant, which constant represents the incremental output level of said amplifier required to bias said servoed device against said stop position.

4. The servoamplifier system of claim 2 further comprising:

a command signal rate limiter for limiting the rate of change of said command signal to a predetermined maximum value responsive to said servoed device approaching said stop position such that said processing means processes a stable output signal from said amplifier means.

5. The servoamplifier system of claim 3 further comprising:

a command signal rate limiter for limiting the rate of change of said command signal to a predetermined maximum value responsive to said servoed device approaching said stop position such that said processing means processes a stable output signal from said amplifier means.

6. The servoamplifier of claim 1 further comprising:

switching means for controllably switching either said command signal, in a first state, or said processing means produced control signal, in a second state, to the servoamplifier driver of said servo controlled device;

and wherein said processing means further comprises:

switch controller means for activating said switching means from said first state to said second state responsive to said servo controlled device being driven to a predetermined position prior to said stop position.

7. The servoamplifier of claim 6 wherein said processing means further comprises a washout circuit which assures a smooth transition at the output of the switching means upon said switching means switching from said first state to said second state.

8. The servoamplifier of claim 2 further comprising:

switching means for controllably switching either said command signal, in a first state, or said processing means produced control signal, in a second state, to the servoamplifier driver of said servo controlled device;

and wherein said processing means further comprises:

switch controller means for activating said switching means from said first state to said second state responsive to said servo controlled device being driven to a predetermined position prior to said stop position.

9. The servoamplifier of claim 8 wherein said processing means further comprises a washout circuit which assures a smooth transition at the output of the switching means upon said switching means switching from said first state to said second state.

10. The servoamplifier of claim 3 further comprising:

switching means for controllably switching either said command signal, in a first state, or said processing means produced control signal, in a second state, to the servoamplifier driver of said servo controlled device;

and wherein said processing means further comprises:

switch controller means for activating said switching means from said first state to said second state responsive to said servo controlled device being driven to a predetermined position prior to said stop position.

11. The servoamplifier of claim 10 wherein said processing means further comprises a washout circuit which assures a smooth transition at the output of the switching means upon said switching means switching from said first state to said second state.

12. The servoamplifier of claim 4 further comprising:

switching means for controllably switching either said command signal, in a first state, or said processing means produced control signal, in a second state, to the servoamplifier driver of said servo controlled device;

and wherein said processing means further comprises:

switch controller means for activating said switching means from said first state to said second state responsive to said servo controlled device being driven to a predetermined position prior to said stop position.

13. The servoamplifier of claim 12 wherein said processing means further comprises a washout circuit which assures a smooth transition at the output of the switching means upon said switching means switching from said first state to said second state.

14. A method in a servo amplifier system which is responsive to a command signal for driving a servo controlled device against a stop position of said device, said method comprising:

a) producing a feedback signal representative of the position of the device;

b) summing said command signal with said feedback signal to produce an error signal;

c) providing amplifying means for receiving said error signal and producing an output signal adapted to drive said servo controlled device; and d) providing processing means for monitoring said amplifier means output signal and, in response to detecting a predetermined condition of said output signal representative of said device being in said stop position, applying a predetermined control signal to said summing means such that said servo controlled device is biased against said stop position with a controlled force said processing means further comprising retraction detection means for determining the condition of said servo controlled device being retracted from said stop position and inhibiting said control signal responsive thereto such that said device may be retracted from the stop position without Opposition from said servo system.

15. The method of claim 14 wherein said step of providing said processing means further comprises the steps of:

i) providing a sample and hold means for storing the value of the amplifier means output signal at a predetermined position of said servo controlled device just prior to said stop position and ii) providing comparator means for comparing said stored amplifier means output signal value with the actual value of said output signal and producing said control signal responsive to a predetermined relationship therebetween.

16. The method of claim 15 wherein said step of providing said comparator means includes producing said control signal responsive to the actual value of the amplifier output signal exceeding said stored value by a predetermined constant, which constant represents the incremental output level of said amplifier required to bias said servo controlled device against said stop position.

17. The method of claim 15 further including the step of providing a command signal rate limiter for limiting the rate of change of said command signal to a predetermined maximum value responsive to said servo controlled device approaching said stop position such that said processing means processes a stable output signal from said amplifier means.

18. The method of claim 14 further comprising the step of:

e) providing switching means for controllably switching either said command signal, in a first state, or said processing means produced signal, in a second state, to the servoamplifier driver of said servo controlled device;

and wherein the step of providing said processing means further comprises providing switch controller means for activating said switching means from said first state to said second state responsive to said servo controlled device being driven to a predetermined position prior to said position.

19. The method of claim 18 wherein the step of providing said processing means further comprises providing a washout circuit which assures a smooth transition at the output of the switching means upon said switching means switching from said first state to said second state.

20. An improved aircraft automatic throttle system wherein a servo amplifier is responsive to a command signal to drive a throttle device towards a forward stop position, the improved system comprising:

position feedback means for producing a feedback signal representative of the position of said throttle device;

summing means for summing said command signal with said feedback signal to produce an error signal;

amplifier means for receiving said error signal and producing an output signal adapted to drive said servo controlled throttle device; and processing means for monitoring said amplifier means output signal and, in response to detecting a predetermined condition of said output signal representative of said device being in said stop position, applying a predetermined control signal to said summing means such that said servo controlled throttle device is biased against said stop position with a controlled force, said processing means further comprising retraction detection means for determining the condition of said servo controlled throttle device being retracted from said stop position and inhibiting said control signal responsive thereto such that said servo control throttle device may be retracted from said stop position without opposition from said servo system.

21. The servoamplifier system of claim 20 wherein said processing means comprises:

sample and hold means for storing the value of the amplifier means output signal at a predetermined position of said servo controlled throttle device just prior to said stop position; and comparator means for comparing said stored amplifier means output signal value with the actual value of said output signal and producing said control signal responsive to a predetermined relationship therebetween.

22. The servoamplifier system of claim 21 wherein said comparator means produces said control signal responsive to the actual value of the amplifier means output signal exceeding said stored value by a predetermined constant, which constant represents the incremental output level of said amplifier required to bias said servo controlled throttle device against said stop position.

23. The servoamplifier system of claim 21 further comprising:

a command signal rate limiter for limiting the rate of change of said command signal to a predetermined maximum value responsive to said servo controlled throttle device approaching said stop position such that said processing means processes a stable output signal from said amplifier means.

24. The servoamplifier of claim 20 further comprising:

switching means for controllably switching either said command signal, in a first state, or said processing means produced control signal, in a second state, to the servoamplifier driver of said servo controlled throttle device;

and wherein said processing means further comprises:

switch controller means for activating said switching means from said first state to said second state responsive to said servo controlled throttle device being driven to a predetermined position prior to said stop position.

25. The servoamplifier of claim 24 wherein said processing means further comprises a washout circuit which assures a smooth transition at the output of the switching means upon said switching means switching from said first state to said second state.

26. The servoamplifier of claim 25 further comprising:

switching means for controllably switching either said command signal, in a first state, or said processing means produced control signal, in a second state, to the servoamplifier driver of said servo controlled throttle device;

and wherein said processing means further comprises:

switch controller means for activating said switching means from said first state to said second state responsive to said servo controlled throttle device being driven to a predetermined position prior to said stop position.

27. The servoamplifier of claim 26 wherein said processing means further comprises a washout circuit which assures a smooth transition at the output of the switching means upon said switching means switching from said first state to said second state.

28. The servoamplifier of claim 22 further comprising:

switching means for controllably switching either said command signal, in a first state, or said processing means produced control signal, in a second state, to the servoamplifier driver of said servo controlled throttle device;

and wherein said processing means further comprises:

switch controller means for activating said switching means from said first state to said second state responsive to said servo controlled throttle device being driven to a predetermined position prior to said stop position.

29. The servoamplifier of claim 28 wherein said processing means further comprises a washout circuit which assures a smooth transition at the output of the switching means upon said switching means switching from said first state to said second state.

30. The servoamplifier of claim 23 further comprising:

switching means for controllably switching either said command signal, in a first state, or said processing means produced control signal, in a second state, to the servoamplifier driver of said servo controlled throttle device;

and wherein said processing means further comprises:

switch controller means for activating said switching means from said first state to said second state responsive to said servo controlled throttle device being driven to a predetermined position prior to said stop position.

31. The servoamplifier of claim 30 wherein said processing means further comprises a washout circuit which assures a smooth transition at the output of the switching means upon said switching means switching from said first state to said second state.

* * * * *